Oct. 25, 1927. 1,646,813
J. A. DAVEY ET AL
APPARATUS FOR EXCAVATING TREE CAVITIES
Filed Jan. 26, 1925 2 Sheets-Sheet 1
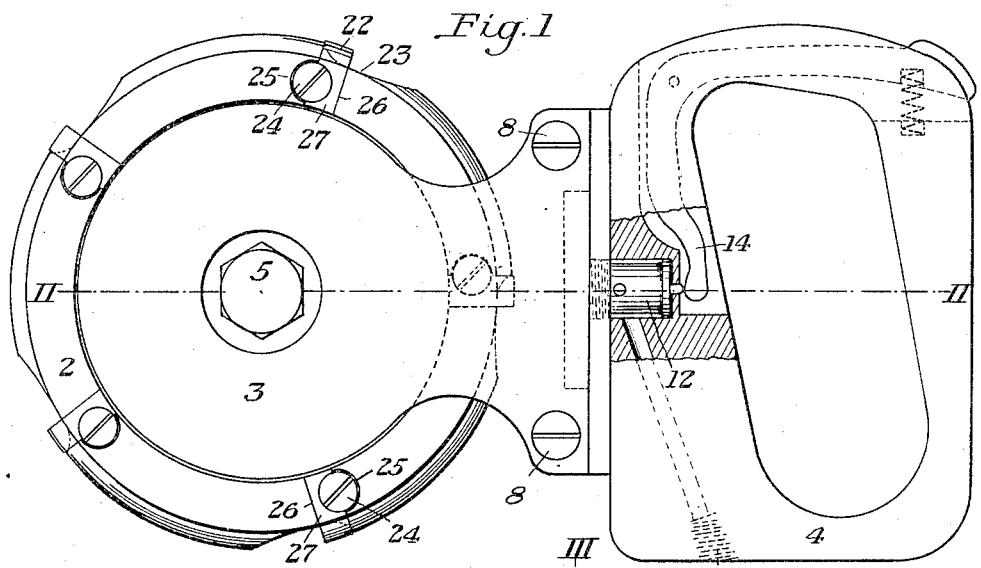
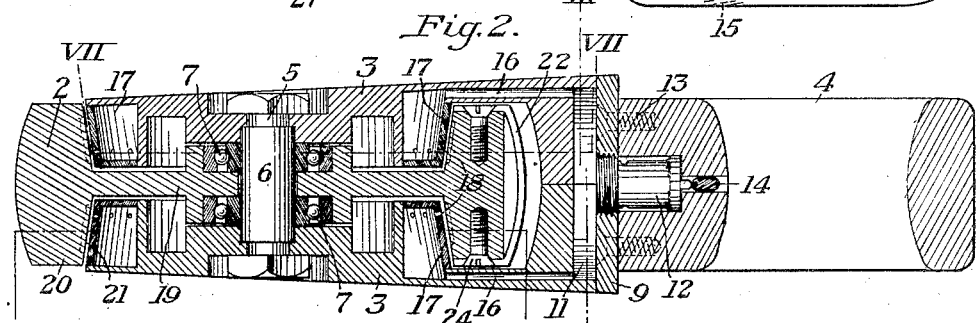
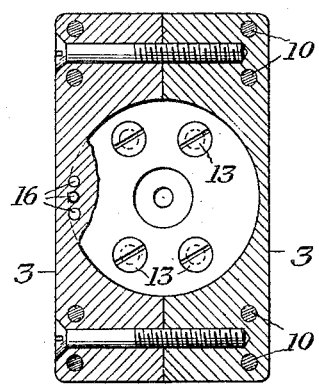
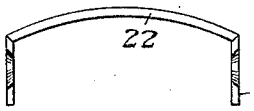
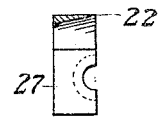
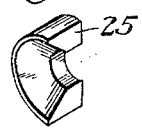
INVENTOR Patented Oct. 25, 1927.

1,646,813

UNITED STATES PATENT OFFICE.

JAMES A. DAVEY, OF SOUND BEACH, CONNECTICUT, AND PAUL H. DAVEY AND CHARLES L. GAUGLER, OF KENT, OHIO; SAID GAUGLER ASSIGNOR OF HIS ENTIRE RIGHT TO THE DAVEY TREE EXPERT COMPANY, OF KENT, OHIO, A CORPORATION OF OHIO.

APPARATUS FOR EXCAVATING TREE CAVITIES.

Application filed January 26, 1925. Serial No. 4,683.

This invention relates to wood cutting tools, and is particularly applicable for excavating and cleaning tree cavities preparatory to filling them with reinforcing material. This application is a continuation in part of our application, Serial No. 655,265, filed August 2, 1923.

Heretofore, in excavating tree cavities, chisels, gouges or burrs have been employed. None of these are satisfactory since they are difficult to handle, and generally result in a rough, unfinished cavity. With such tools as chisels and gouges the constant hammering incidental to their employment generally results in a loosening of the tree bark from the cambium layer, with the result that the healing over of the filled cavity is very much delayed and sometimes is entirely prevented.

We provide an excavating tool of the rotary type consisting of a fluid actuated turbine with cutting blades on the periphery thereof. These blades are preferably curved and are preferably as wide as the turbine rotor. They are also preferably curved and they are effective for giving a smooth finish to a tree cavity within a very short time. The cutting blades are provided with guards to limit the depth of cut and the blades are self-clearing. As a result, both decayed and solid wood may be rapidly removed from the interior of the tree without producing any sharp corners which might be passed by in waterproofing the cavity, with the possibility of further decay. Also, the cleaning and shaping of the cavity is accomplished without the harmful tapping which accompanies the use of chisels or gouges, and the stream of exhaust air which is constantly issuing from the tool may be used to blow the chips out of the cavity, thus materially simplifying the work of the tree surgeon. This application is a specific embodiment of the invention described and broadly claimed in our co-pending application, Serial No. 655,264, filed August 2, 1923.

In the accompanying drawings illustrating the present preferred embodiment of our invention:—

Figure 1 is a side view of a tree excavating tool embodying our invention,

Figure 2 is a horizontal section taken on the line II—II of Figure 1,

Figure 3 is a vertical section taken on the line III—III of Figure 2,

Figure 7:
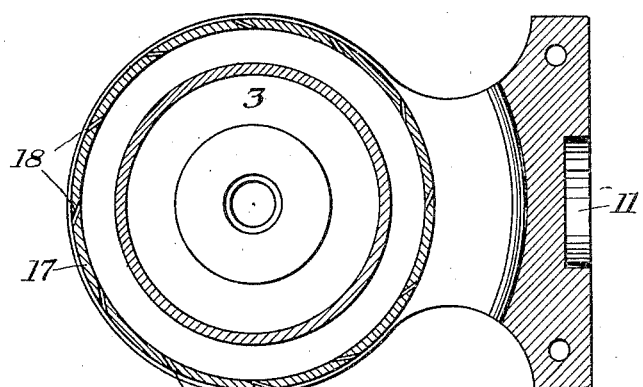
Figure 8:
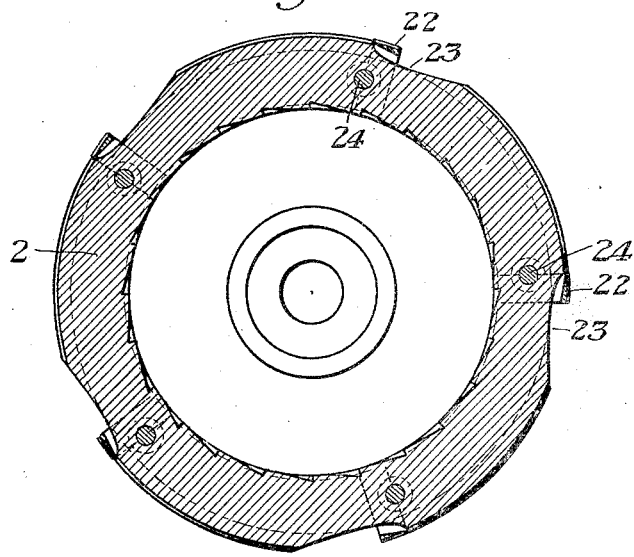

Figures 4 and 5 are an end view and a central vertical section, respectively, of one of the cutting blades used, Figure 6 is a perspective view of an insert used in fastening the blades to the turbine rotor, Figure 7 is a vertical section on the line VII—VII of Figure 2 showing one of the frame members only, and Figure 8 is a section taken on the line VIII—VIII of Figure 2 showing the turbine rotor only.

In the illustrated embodiment of our invention a turbine rotor 2 is carried between a pair of frame members 3 which are directly secured to a handle 4. The cutting head 2 is free to rotate, being carried by a center bolt 5, a bushing 6 and ball-bearings 7. The two supporting members 3 are held together by the bolt 5 and screws 8. Secured to one face of the frame members 3 is a plate 9 which is fastened by screws 10. Openings provided in the frame members 3 cooperate with the plate 9 to form a chamber 11 adapted to receive air or other actuating fluid through a spring closed valve 12. This valve, as shown in Figures 1 and 2, is secured in the plate 11 and extends into the handle 4, the handle 4 being fastened to the plate 9 by screws 13. A thumb operated trigger 14 is provided within the handle for actuating the valve 12, and a connection 15 is provided for an air hose or the like.

Air passes from the chamber 11 through conduits 16 in each of the frame members 3 to an annular header 17. These headers are provided with a series of turbine nozzles 18. The turbine rotor 2 has a central web 19 and a wide rim 20, and turbine buckets 21 are formed on the inner faces of this rim. The headers 17 lie just within the rim and the air is supplied to the turbine buckets 21 adjacent the central web 19. The air moves away from the central rim to both sides of the tool and serves to keep dust and chips out of the working mechanism. Whenever the trigger 14 is actuated to admit a fluid, such as air, the rotor is turned at an extremely high speed, i. e., at speeds from 15000 to 25000 R. P. M. and is effective for cutting wood at a surprisingly rapid rate. It will be noted that the diameter of the bucket circle is greater than the diameter of the nozzle circle, this construction being particularly desirable in a tool of this character since it gives a greater torque arm and wider range of effectiveness for the nozzles. It is also highly desirable in that it permits of a more compact tool than could be otherwise secured.

The rim 20 is provided with a plurality of removable cutting blades 22. These blades are rounded, as best shown in Figure 4, in order to give a smooth finish to the cavity being worked on. The outer portion of the rim 20 is rounded to correspond to the curvature of the blades 22 and serves as a guard to limit the depth of cut. Chip spaces 23 are provided in the rim to make the tool self-clearing.

In the construction of the tool it is desirable to use aluminum or some other light metal in order to make a light hand tool. It is necessary, however, to tightly secure the blades to this aluminum rotor as by screws 24, and we have found that the screw rapidly cuts into the metal of the rotor and materially reduces the life of the tool in ordinary operation where blades are frequently changed. We therefore provide a semi-annular insert 25 and provide a hole in the rotor to accommodate the same. The sides of the rim are slotted, as at 26, and the portions 27 of the cutting blades fit into these slots. A screw hole is provided for the screw 24 and the hole is enlarged for a sufficient depth to accommodate the insert 25. This insert is made of steel and is placed as shown in Figure 1. The screw 24 is then inserted and it may be screwed down tight without the screw head cutting into the body of the rotor.

In operation the cutting head is placed in the tree cavity and air is admitted to the tool. The cutting head rotates at very high speed and rapidly trims away decayed matter, leaving a smooth cavity for waterproofing and subsequent operations. It is extremely light and convenient to use and is effective not only for removing decayed wood, but also sound wood, as may be required to properly shape the tree cavity. The tool is self-clearing and the exhaust air may be used to clean out the cavity as desired. Instead of the rough edges which result from the use of such tools as gouges and chisels, the apparatus herein described rapidly chips away the interior of the cavity in such manner as to leave a smooth surface which may be readily treated as desired in the practice of tree surgery.

While we have shown the preferred embodiment of our invention it will be understood that it is not limited to this illustrated form, but may be otherwise embodied within the scope of the following claims.

We claim:

1. A wood cutting tool including a fluid actuated turbine having a rim, cutting blades on the outer face of the rim, said blades operating over the entire width of the tool, turbine buckets on the inner face of the rim, and means for supplying actuating fluid thereto, substantially as described.

2. A wood cutting tool including a fluid actuated turbine, cutting blades on the periphery thereof, said blades operating over the entire width of the tool, an undercut portion having turbine buckets therein, and means for supplying actuating fluid to the buckets, substantially as described.

3. A wood cutting tool including a fluid actuated turbine having a rim, cutting blades on the outer face of the rim and substantially the width thereof, turbine buckets inside the rim, and means for supplying actuating fluid thereto, substantially as described.

4. A device for excavating tree cavities, including a direct driven rotary cutting tool rim, guards rotating with the tool for limiting the depth of cut, and a handle for guiding and supporting the cutting tool, substantially as described.

5. A device for excavating tree cavities, including a rotary cutting tool having a rim extending from side to side of the tool, replaceable cutting blades on the outside of the rim and turbine buckets on the inside of the rim, a handle for the cutting tool, and means for supplying an actuating fluid to the turbine buckets through the handle, substantially as described.

6. A device for excavating tree cavities, including a rotor having a rim, the rim having a cut away portion on the outer face thereof to form a chip space, a cutter mounted thereover, the cutter projecting beyond the outer face of the rim and being at least as wide as the rim, turbine buckets on the inner face of the rim, and means for supplying actuating fluid to the buckets, substantially as described.

7. A device for excavating tree cavities, including a rotor having a rim with a curved outer face, cutter blades mounted on the outer face of the rim and at least as wide as the rim, the blades having the same general contour as the outer face of the rim, turbine buckets on the inner face of the rim, and means for supplying actuating fluid to the buckets, substantially as described.

8. A rotary cutting tool including a rotor of relatively light soft material, a cutting tool, a slot in the rotor adapted to accommodate the tool, a screw of relatively hard material, in the rotor having a head adapted to bear at one side against a portion of the tool in the slot and hold the same in place, and an insert of relatively hard material, adapted for engagement by the other side of the screw head, substantially as described.

9. A wood cutting tool including a fluid actuated turbine rotor having a recess in a side thereof, cutting blades on the exterior of the rotor, a frame embracing the rotor and fitting into such recess, the frame including a handle, control means on the frame for regulating the supply of actuating fluid, the portion of the frame fitting into said recess having turbine nozzles and the rotor having pockets co-operating therewith.

10. A wood cutting tool including a fluid actuated turbine rotor having a flange and a relatively thin central web so as to provide recesses on either side of the rotor, cutting blades on the rim, a pair of frame members embracing the rotor and fitting into said recess, the frame members being provided with passages leading to the portions thereof which fit into such recesses and being also provided with turbine nozzles in such portions, and means connecting the frame members together, said means including a shaft for the rotor.

11. A wood cutting tool including a liquid actuated turbine rotor having a rim with cutting blades, thereon and having a side recess, a frame for supporting the rotor, the frame having a handle and having a portion which fits into the recess, said frame being so shaped as to leave a major portion of the periphery of the rotor exposed for cutting and also having a portion fitting into the recess and provided with turbine nozzles adapted to supply adequate fluid to the rotor.

12. A rotary tool for excavating tree cavities comprising a rotor having cutting blades on the periphery thereof, the rotor having a depression in the side face and having turbine buckets in the wall of the depression and a frame member fitting into the depression and provided with turbine nozzles cooperating with the buckets.

13. A rotary tool for excavating tree cavities comprising a ring like rotor having cutting blades on the periphery thereof and a frame structure extending into the interior of the ring and cooperating with the ring to form a driving turbine for the ring, the apparatus having an outlet for spent fluid between the frame and ring whereby said spent fluid may be utilized for blowing chips out of the cavity.

14. A planer comprising a frame, a rotor thereon, cutter blades on the rotor, a nozzle circle on the frame, a bucket circle on the rotor exterior to and of greater diameter than the nozzle circle, and means for supplying actuating fluid to the nozzles.

15. A planer comprising a frame, a rotor thereon having a depression in a side face, buckets formed on the outer wall of said depression, cutter blades on the rotor, an annular chamber on the frame extending into said depression, and nozzles in the outer wall of the chamber for directing operating fluid to said buckets.

16. A planer comprising a frame, a rotor journaled on the frame said rotor having annular depressions in opposite side faces, cutter blades on the rotor, annular chambers on the frame extending into said depressions, and nozzles in the outer walls of said chambers directing operating fluid to buckets on the adjacent walls of said depressions.

17. A planer comprising a frame, a rotor journaled on the frame said rotor having annular bucket-forming depressions in opposite side faces, cutter blades on the rotor, annular chambers on the frame extending into said depressions, and nozzles in the outer walls of said chambers directing operating fluid to buckets on the adjacent walls of said depressions, said nozzles being arranged close to the rotors adjacent the inner end of the buckets and a narrow clearance being provided between the adjacent portions of the rotor and frame whereby the spent operating fluid is directed outwardly.

18. A planer comprising a frame having a rearwardly projecting handle said frame being flattened at opposite sides, a rotor journaled in said frame on an axis extending through said faces, and peripheral blades on the rotor said blades having a cutting action at the front of the planer over a distance at least as great as the distance between the extended planes of said side faces.

19. A manually-directed, power-operated planing tool for excavating and smoothing tree cavities comprising a frame, a handle thereon, a high speed rotor having peripheral blades with cutting edges curved laterally of the plane of rotation on an arc whose radius is substantially that of but not greater than that of a circle having its center at the axis of the rotor, and fluid-pressure means for driving said rotor, substantially as described.

20. A planing tool for excavating tree cavities including a frame, a handle thereon, an annular rotor turning in a plane passing through the handle, peripheral blades on the rotor, laterally opening turbine buckets in the rotor, and means on the frame to supply actuating fluid to the buckets, the exhaust actuating fluid passing out between the rotor and the frame to blow the chips out of the cavity.

21. A planer for excavating tree cavities comprising a rotor, peripheral cutter blades on the rotor, high-speed turbine driving means for said rotor and gaging means for said blades on the rotor acting to limit the high-speed cut to a thin chip.

22. A planer for excavating tree cavities comprising a rotor, peripheral blades on the rotor, means for driving the rotor at least 15000 R. P. M. and gaging means for said blades on the rotor whereby said gaging means act to limit the high-speed cut to a very thin chip.

23. A planer for tree surgery comprising a rotor, and blades on the rotor having peripheral cutting edges and lateral cutting edges in planes approximately perpendicular to the axis of the rotor.

In testimony whereof we have hereunto set our hands.

JAMES A. DAVEY.
PAUL H. DAVEY.
CHARLES L. GAUGLER.